US009656641B2

(12) United States Patent
Griffith et al.

(10) Patent No.: US 9,656,641 B2
(45) Date of Patent: May 23, 2017

(54) AIRCRAFT ELECTRICAL BRAKE CONTROL SYSTEM ARCHITECTURE

(75) Inventors: T. Todd Griffith, Seattle, WA (US); David T. Yamamoto, Mill Creek, WA (US); Erik L. Godo, Redmond, WA (US); Tu-Luc H. Nguyen, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 1668 days.

(21) Appl. No.: 11/462,510

(22) Filed: Aug. 4, 2006

(65) Prior Publication Data
US 2008/0030069 A1    Feb. 7, 2008

(51) Int. Cl.
*B60T 13/00* (2006.01)
*B60T 13/74* (2006.01)
*B60T 8/17* (2006.01)
*B60T 7/04* (2006.01)
*B60T 8/32* (2006.01)

(52) U.S. Cl.
CPC ............ *B60T 8/1703* (2013.01); *B60T 7/042* (2013.01); *B60T 8/325* (2013.01); *B60T 13/741* (2013.01); *B60T 2270/404* (2013.01); *B60T 2270/82* (2013.01)

(58) Field of Classification Search
CPC ........ B60T 7/042; B60T 8/1703; B60T 8/325; B60T 13/741; B60T 2270/404; B60T 2270/82
USPC ........ 303/2, 5, 13, 9.63, 122.04, 122.09, 20; 244/110 A, 111; 701/33, 36, 76
See application file for complete search history.

(56) References Cited

U.S. PATENT DOCUMENTS

| 2,957,658 | A  | * | 10/1960 | Nichols ......................... 244/111 |
| 6,095,293 | A  |   | 8/2000  | Brundrett et al. |
| 6,296,325 | B1 | * | 10/2001 | Corio et al. .................... 303/20 |
| 6,402,259 | B2 | * | 6/2002  | Corio et al. .................... 303/20 |
| 6,513,885 | B1 | * | 2/2003  | Salamat et al. .......... 303/122.09 |
| 6,604,030 | B1 |   | 8/2003  | Davis et al. |
| 6,820,946 | B2 | * | 11/2004 | Salamat et al. .......... 303/122.09 |
| 7,401,869 | B2 | * | 7/2008  | Mallevais et al. ............ 303/126 |

(Continued)

FOREIGN PATENT DOCUMENTS

| EP | 1 637 422 A1 | 9/2005 |
| EP | 07 07 5514 | 3/2007 |
| WO | PCT/US00/19213 | 7/2000 |

OTHER PUBLICATIONS

European Patent Office, Communication Pursuant to Article 94(3) EPC for application No. 07075514.5 dated Mar. 20, 2012.

*Primary Examiner* — Melody Burch
(74) *Attorney, Agent, or Firm* — Parson Behle & Latimer

(57) ABSTRACT

An electric brake system architecture for an aircraft with two or more electrical braking subsystems including brake system controls configured to communicate pilot pedal commands to electric brake actuator controllers that apply or release brakes in wheel groups. The system allows independent brake activation of wheel groups through a plurality of brake system controls and electric brake actuator controllers. The electric braking system further includes remote data consolidators to collect and transmit wheel data to brake system controls through a digital data communication bus. The system reduces aircraft weight, prevents inadvertent braking, and prevents error propagation between subsystems.

21 Claims, 4 Drawing Sheets

(56) References Cited

U.S. PATENT DOCUMENTS

| | | | |
|---|---|---|---|
| 7,489,996 B2* | 2/2009 | Gowan et al. | 701/71 |
| 2005/0012553 A1* | 1/2005 | Mondal et al. | 330/282 |
| 2005/0192733 A1 | 9/2005 | Dellac et al. | |
| 2005/0251306 A1 | 11/2005 | Gowan et al. | |
| 2006/0144438 A1* | 7/2006 | Dresselhaus et al. | 137/78.3 |
| 2007/0084682 A1* | 4/2007 | Griffith et al. | 188/156 |
| 2008/0258547 A1* | 10/2008 | Ralea et al. | 303/122 |

* cited by examiner

AIRCRAFT ELECTRICAL BRAKE CONTROL SYSTEM ARCHITECTURE

TECHNICAL FIELD

Embodiments of the present invention relate generally to aircraft control systems, and more particularly to aircraft electrical brake control systems.

BACKGROUND

Historically aircraft braking control has been operated via direct cable or hydraulic connection. Cable and hydraulic control connections suffered from weight, performance and reliability issues. Many of these issues have been improved upon by using electrically actuated and controlled brake systems. Electrically actuated and controlled brake systems are colloquially referred to as "brake by wire" systems.

It is desirable to have an electric brake system that provides reliable redundancy for aircraft braking systems. In addition, it is desirable to have a system that protects against inadvertent brake applications where a braking subsystem applies the brakes when it shouldn't. Other desirable features and characteristics of embodiments of the present invention will become apparent from the subsequent detailed description and the appended claims, taken in conjunction with the accompanying drawings and the foregoing technical field and background.

BRIEF SUMMARY

An electric brake system architecture as described herein is suitable for use with an aircraft having two or more electrical braking subsystems. These subsystems include brake system controls configured to communicate pilot pedal commands to an electric brake actuator controller or controllers that apply or release brakes for designated wheel groups. The brake subsystems utilize a plurality of control units configured to generate brake control signals for the landing gear wheels in response to pilot input. The brake subsystems may also use at least one electric brake actuator controller coupled to and controlled by the brake system control unit. These actuator controllers are configured to generate brake mechanism control signals for the landing gear brakes. In one practical embodiment, the electric brake system has at least one left landing gear wheel group controlled by one brake subsystem and at least one right landing gear wheel group controlled by another brake subsystem. Here, left and right refer to the port and starboard of the aircraft respectively relative to the center line of the plane.

In a further example embodiment, the electric braking system further includes remote data concentrators that collect and transmit wheel data to brake system control units through a digital data communication bus. The system allows independent brake activation of wheel groups through a plurality of brake system control units, electric brake actuator controllers, and electrical power distribution. The system reduces aircraft weight and prevents inadvertent braking and error propagation between subsystems.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
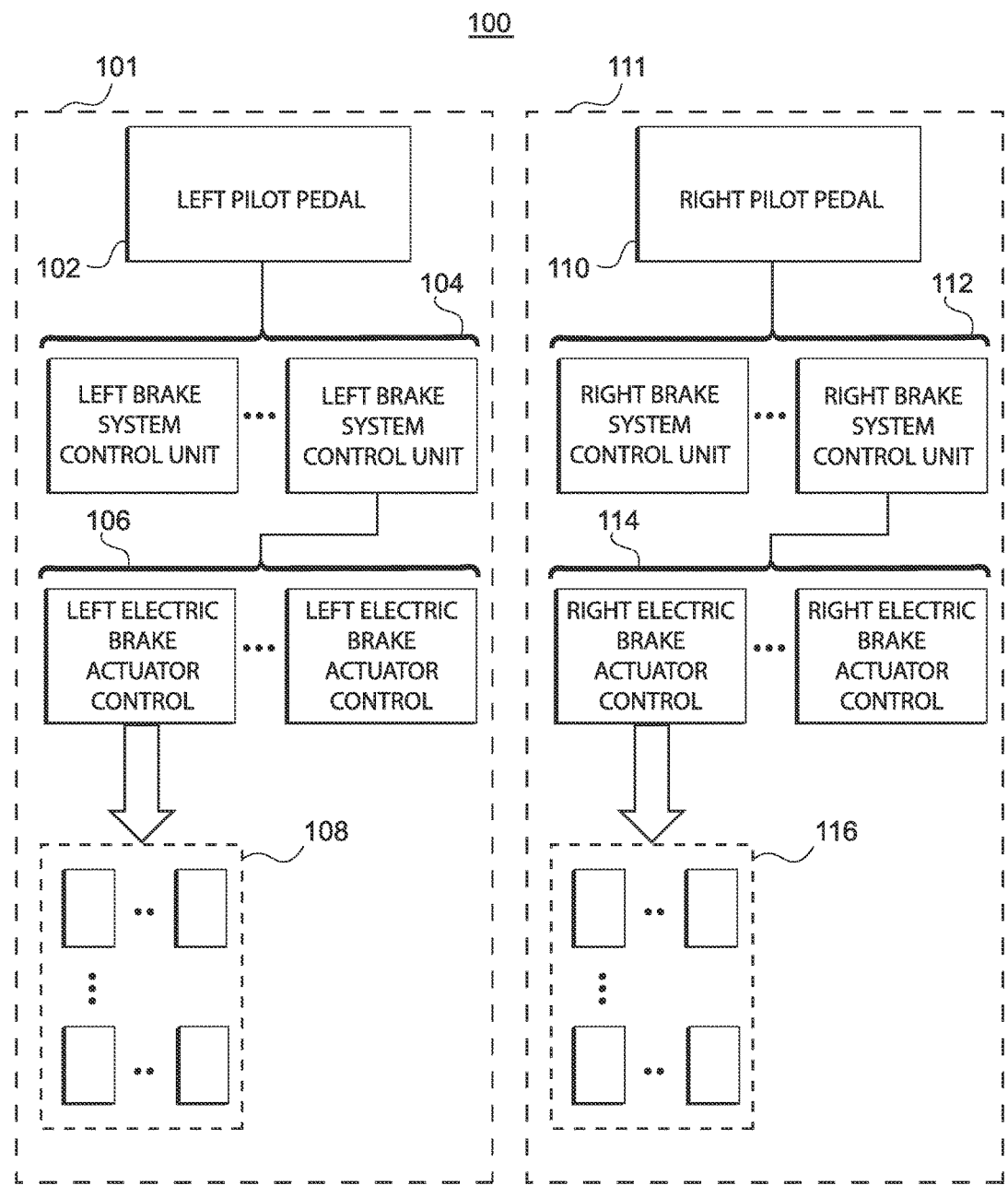
FIG. 1 is a schematic representation of a general electrical braking system for an aircraft according an example to an embodiment of the invention.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various electric brake actuators, integrated circuit components, e.g. memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of digital data transmission protocols and/or aircraft configurations, and that the system described herein is merely one example embodiment of the invention.

For the sake of brevity, conventional techniques and components related to signal processing, aircraft braking, braking control, and other functional aspects of the systems and the individual operating components of the systems may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to or directly communicates with another element/node/feature, and not necessarily mechanically. Likewise, unless expressly stated otherwise, "coupled" means that one element/node/feature is directly or indirectly joined to or directly or indirectly communicates with another element/node/feature, and not necessarily mechanically. Thus, although the schematics shown in the figures depict example arrangements of elements, additional intervening elements, devices, features, or components may be present in an embodiment of the invention (assuming that the functionality of the system is not adversely affected).

Embodiments of the invention are described herein in the context of one practical application, namely, an aircraft braking system. In this context, the example technique is applicable to provide redundancy and avoid inadvertent brake application on an aircraft. Embodiments of the invention, however, are not limited to such aircraft applications, and the techniques described herein may also be utilized in other applications.

FIG. 1 is a schematic representation of a general electrical braking system 100 for an aircraft according to an example embodiment of the invention. The system described herein can be applied to any number of electrical braking configurations for an aircraft, and electric brake system 100 is depicted in a generic manner to illustrate its deployment flexibility. In this example, the electric brake system 100 may include a left side electrical braking subsystem architecture 101 and a right side braking subsystem architecture 111. The terms "left" and "right" as used herein refer to the port and starboard of the aircraft respectively relative to the center line of the plane. These terms are used herein for convenience of description and are not intended to limit or restrict the scope or application of the invention in any way. In practice, the two subsystem architectures may be independently controlled in the manner described below. In operation, the electric brake system can independently generate and apply brake actuator control signals for each wheel of the aircraft. The electrical power distribution for the system embodiments are not shown in FIG. 1 and will be discussed with respect to FIG. 4 below.

The left side electrical braking subsystem architecture 101 may include a left pilot pedal 102 configured to provide pilot input to left subsystem architecture 101, at least one left brake system control unit ("BSCU") 104 coupled to left pilot pedal 102, and at least one left electric brake actuator control ("EBAC") 106 configured to generate brake mechanism control signals for at least one left wheel group 108.

The pilot physically manipulates the left pilot pedal 102 to generate a left pilot pedal physical input. The left pilot pedal physical input is measured from its natural position by a hardware servo or an equivalent component, converted into a left BSCU pilot command control signal by a transducer or an equivalent component, and sent to the at least one left BSCU 104.

An embodiment may use any number of BSCUs 104 but the example described below uses only one left side BSCU 104. The BSCU is an electronic control unit that has embedded software to digitally compute the braking command. The electrical/software implementation allows further optimization and customization of braking performance and feel. The BSCU 104 may be generally realized by a microcontroller, which includes suitable processing logic and software that is configured to carry out the BSCU operations described herein. The microcontroller may be a computer such as, without limitation, a PowerPC 555 that hosts software and provides external interfaces for the software. The BSCU monitors various airplane inputs to provide control functions such as, without limitation, pedal braking, parking braking, autobrake and gear retract braking. In addition, the BSCU blends the antiskid command (which could be generated internal or external from the BSCU) to provide optimal control of braking. The BSCU 104 obtains pedal control signals and wheel data such as wheel speed, rotational direction value for the wheels, and tire pressure as described below. The BSCU 104 processes its input signals and generates one or more BSCU output signals that are used as input to EBACs 106. The BSCU transmits the brake command to the EBAC through a digital data bus to minimize airplane wiring. In this generalized architecture, each BSCU 104 can generate independent output signals for use with any number of the EBACs 106 under its control.

Each BSCU 104 may be coupled to one or more associated EBACs 106. An EBAC 106 may be realized as a microcontroller which includes suitable processing logic and software that is configured to carry out the EBAC operations described herein. The microcontroller may be a computer such as, without limitation, a PowerPC 555 that hosts software and provides external interfaces for the software. Each EBAC 106 obtains BSCU output signals, processes those signals, and generates the actuator signals that are used to control the brake mechanisms for the wheels.

Each wheel group 108 includes one or more wheels with any arrangement, and each wheel group 108 may have a designated EBAC. FIG. 1 only shows one wheel group 108 for the sake of simplicity. In FIG. 1, the wheel group 108 is generally depicted as a two-dimensional array having one or more rows and one or more columns; however, this general configuration is not meant to limit or restrict the scope or the application of the invention in any way. Indeed, the example embodiment described below includes two wheels in each wheel group 108: a fore wheel and an aft wheel.

Each wheel in the wheel group 108 includes a brake mechanism controlled by the EBACs 106 to apply, release, modulate, and otherwise control the brakes. In this regard, EBACs 106 generate electric brake actuator (EBA) signals in response to the respective BSCU output signals. The EBA signals are suitably formatted and arranged for compatibility with the particular brake mechanisms on the aircraft. In practice, the EBA signals may be regulated to carry out anti-skid and other braking maneuvers. Those skilled in the art are familiar with aircraft brake mechanisms and the manner in which they are controlled, and such known aspects will not be described in detail here.

The right side electrical braking subsystem architecture 111 has a structure that is similar to the left side electrical braking subsystem architecture 101. Accordingly, the configuration and operation of these components will not be redundantly described herein. As shown in FIG. 1, the right side electrical braking subsystem architecture 111 may include a right pilot pedal 110 configured to provide pilot input to right subsystem architecture 111, at least one right BSCU 112 coupled to right pilot pedal 110, and at least one right EBAC 114 configured to generate brake mechanism control signals for at least one right wheel group 116.

Figure 2:
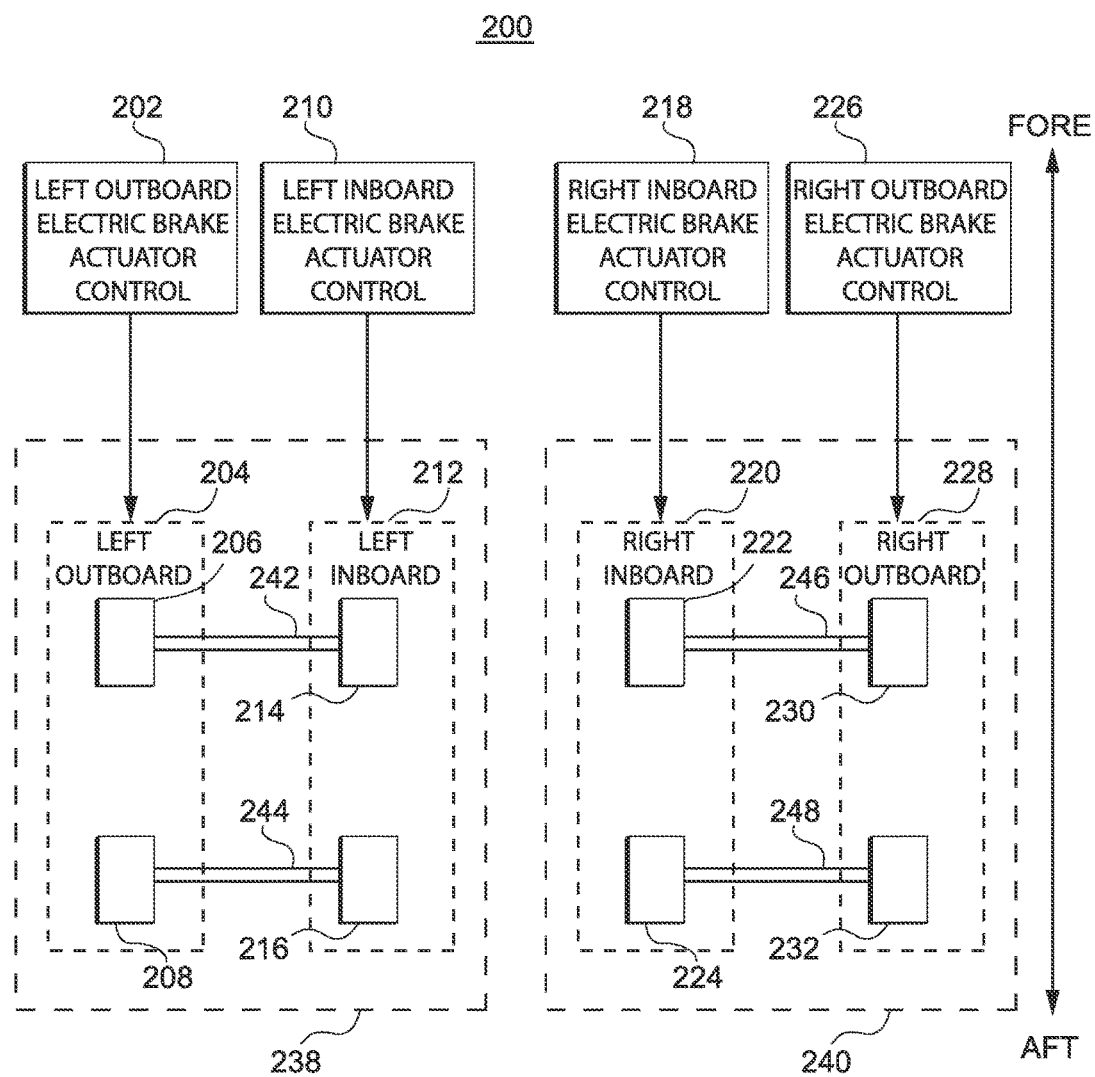
FIG. 2 is a diagram of a landing gear wheel configuration for an example aircraft that utilizes an electrical braking system configured in accordance with an embodiment of the invention.

Although FIG. 1 shows a general wheel grouping scheme example, where each landing gear includes N wheel groups coupled to N EBACs respectively, the example embodiment includes a left landing gear having four wheels (two wheel groups) and a right landing gear having four wheels (two wheel groups) as shown in the wheel configuration of FIG. 2. In this regard, FIG. 2 is a diagram of a landing gear wheel configuration 200 for an example aircraft. The landing gear wheel configuration 200 includes a left landing gear wheel arrangement 238 and a right landing gear wheel arrangement 240.

The left landing gear wheel arrangement 238 may include a left outboard wheel group 204 and a left inboard wheel group 212. The left outboard wheel group 204 may include a fore left outboard wheel 206 and an aft left outboard wheel 208. Likewise, the left inboard wheel group 212 may include a fore left inboard wheel 214 and an aft left inboard wheel 216. The wheels in the left wheel groups 204 and 212 are coupled to respective axles 242 and 244 respectively. In this example, the brake system includes a left outboard EBAC 202 coupled to the left outboard wheel group 204, and a left inboard EBAC 210 coupled to the left inboard wheel group 212. Left outboard EBAC 202 is suitably configured to generate brake control signals for wheels 206/208, while left inboard EBAC 210 is suitably configured to generate brake control signals for wheels 214/216 in response to wheel data as explained in detail below.

The right landing gear wheel arrangement 240 is similar to the left landing gear wheel arrangement 238. The right landing gear wheel arrangement 240 may include a right outboard wheel group 228 and a right inboard wheel group 220. The right outboard wheel group 228 includes a fore right outboard wheel 230 and an aft right outboard wheel 232. The right inboard wheel group 220 includes a fore right inboard wheel 222 and an aft right inboard wheel 224. The wheels in the right wheel groups 220 and 228 are coupled to respective axles 246 and 248 respectively. In this example, the brake system includes a right outboard EBAC 226 coupled to the right outboard wheel group 228, and a right inboard EBAC 218 coupled to the right inboard wheel group 220. Right outboard EBAC 226 is suitably configured to generate brake control signals for wheels 230/232, while right inboard EBAC 218 is suitably configured to generate brake control signals for wheels 222/224 in response to wheel data as explained in detail below.

Figure 3:
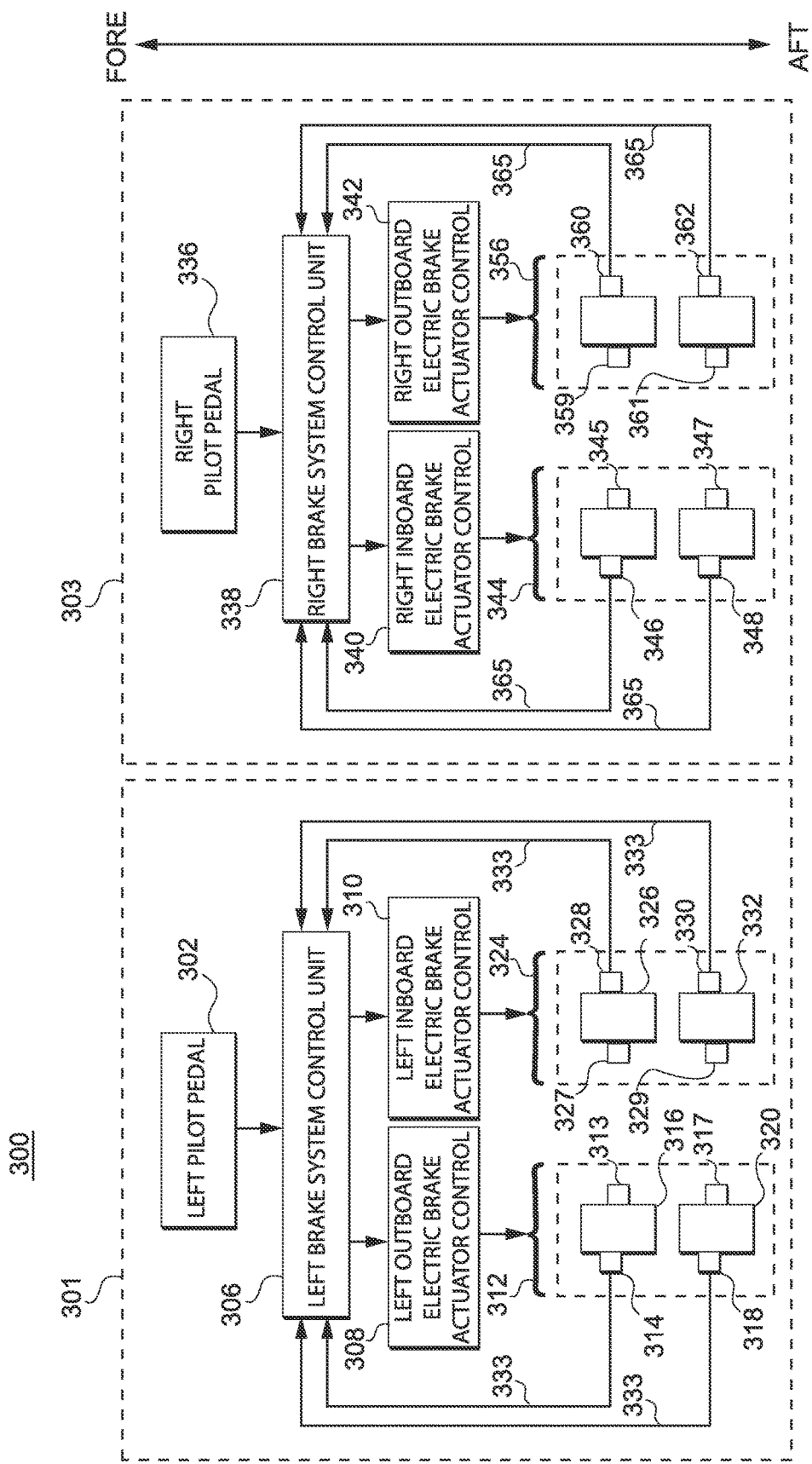
FIG. 3 is a schematic representation of one example deployment of the electrical braking system depicted in FIG. 1 according to an example embodiment of the invention.

The landing gear wheel configuration 200 shown in FIG. 2 may be supported by an electrical braking system for an aircraft such as that shown in FIG. 3. FIG. 3 is a schematic representation of one example deployment of the general electrical braking system architecture for an aircraft depicted in FIG. 1. The electrical braking system 300 shown in FIG. 3 may generally include a left side electric brake subsystem architecture 301 and a right side electric brake subsystem architecture 303 similar to FIG. 1. Electrical braking system 300 may share some components, features, and functionality with electrical braking system 100 and/or with wheel configuration 200, and such common aspects will not be redundantly described in detail with respect to electrical braking system 300.

In the example deployment shown in FIG. 3, each of the right side and the left side electric brake subsystem architectures 301 and 303 may include one pilot pedal, one BSCU, one inboard-outboard pair of EBACs; one inboard-outboard pair of wheel groups, and four landing gear wheels including one fore-aft pair of wheels for each wheel group. Each left side and right side electric brake subsystem architecture 301 and 303 respectively may also include a plurality of sensors, a plurality of remote data concentrators (RDCs), and a digital data communication bus. Each sensor may be coupled to their respective wheel, and each sensor may be suitably configured to measure wheel data for each of their respective wheel that can be utilized by electrical braking system 300. Each RDC is coupled to a respective wheel, and each RDC is configured to collect and transmit its wheel data to a BSCU. The digital data communication bus or buses may be configured to communicate the wheel data from the RDCs to the brake system control units.

For this example deployment, as shown in FIG. 3, the left electric brake subsystem architecture 301 may include: a left pilot pedal 302; a left BSCU 306; a left outboard EBAC 308; a left inboard EBAC 310; a left outboard wheel group 312; a left inboard wheel group 324; four left sensors (reference numbers 313, 317, 327 and 329), and four RDCs (reference numbers 314, 318, 328, and 330) corresponding to each wheel in each of the wheel groups in the left subsystem architecture 301.

Left pilot pedal 302 and left BSCU 306 are generally configured as described above with respect to FIG. 1. In this example, the left subsystem architecture 301 employs one BSCU 306, which is coupled between left pilot pedal 302 and each of the left EBACs 308 and 310. As described in more detail below, left BSCU 306 is also coupled to the four RDCs to receive wheel data for the respective wheels.

Left outboard EBAC 308 is connected to the left outboard RDCs 314/318 and is configured to generate brake control signals for the left outboard landing gear wheels 316 and 320 in response to wheel data collected by the left outboard RDCs 314/318. Left inboard EBAC 310 is coupled to the left inboard RDCs 328/330 and configured to generate brake control signals for the left inboard landing gear wheels 328 and 330 in response to wheel data collected by the left inboard RDCs 328/330.

The left subsystem architecture 301 utilizes four RDCs (reference numbers 314, 318, 328, and 330) and a suitable data communication bus 333 for wheel data communication. An RDC is generally configured to receive, measure, detect, or otherwise obtain data for processing and/or transmission to a subsystem. In this example embodiment, the digital data communication bus 333 is configured to communicate the wheel data from the RDCs (reference numbers 314, 318, 328, and 330) to the BSCU 306 using any suitable data communication protocol and any suitable data transmission scheme. In an alternate embodiment, RDCs (reference numbers 314, 318, 328, and 330) may be configured to communicate the wheel data to the EBACs 308/310. In yet another embodiment, the RDCs (reference numbers 314, 318, 328, and 330) may be configured to communicate the wheel data to the BSCU 306 as well as to the EBACs 308/310. Each RDC is installed at or near the end of each axle; thus, a given RDC may be mounted in an outboard location or an inboard location. For this example embodiment, the left electric brake subsystem architecture 301 includes a fore left outboard RDC 314 coupled to the fore left outboard wheel 316, an aft left outboard RDC 318 coupled to the aft left outboard wheel 320, a fore left inboard RDC 328 coupled to the fore left inboard wheel 326, and an aft left inboard RDC 330 coupled to the aft left inboard wheel 332.

The left outboard EBAC 308 may be configured to generate brake control signals for the outboard wheels 316 and 320 in response to wheel data collected by the RDCs 314 and 318. The left inboard EBAC 310 may be configured to generate brake control signals for the inboard wheels 326 and 332 in response to wheel data collected by the RDCs 328 and 330. The left sensors (reference numbers 313, 317, 327 and 329) may include, for example, a wheel speed sensor, a rotation sensor, a brake temperature sensor, and/or an air pressure sensor coupled to their respective wheel (reference number 316, 320, 326 and 322) and are configured to measure data corresponding to their respective wheel (reference number 314, 320, 326 and 322). In this example embodiment, left sensors or portions thereof may be realized in the RDCs.

In operation, the left BSCU 306 is configured to generate pilot command control signals for EBACs 308 and 310, which in turn generate brake actuator control signals for the landing gear brakes in their respective wheel group 312 and 324. BSCU 306 generates its output control signals in response to the wheel data measured by the left sensors (reference numbers 313, 317, 327 and 329). Consequently, EBACs 308 and 310 also generate their output control signals in response to the BSCU command.

The right side electrical braking subsystem architecture 303 has a structure that is similar to the left side electrical braking subsystem architecture 301. For this example deployment, as shown in FIG. 3, the right electric brake subsystem architecture 303 may include a right pilot pedal 336, a right BSCU 338; a right outboard EBAC 342, a right inboard EBAC 340, a right outboard wheel group 356, a right inboard wheel group 344, four right sensors (reference numbers 345, 347, 360 and 362), and four RDCs (reference numbers 345, 347, 359, and 361) corresponding to their respective wheel in each of the wheel groups in the right subsystem architecture 303. These RDCs communicate wheel data or antiskid data to BSCU 338 via a suitable digital data communication bus 365. These components are coupled together to operate as described above for left subsystem architecture 301, however, the right-side processing is preferably independent of the left-side processing.

Figure 4:
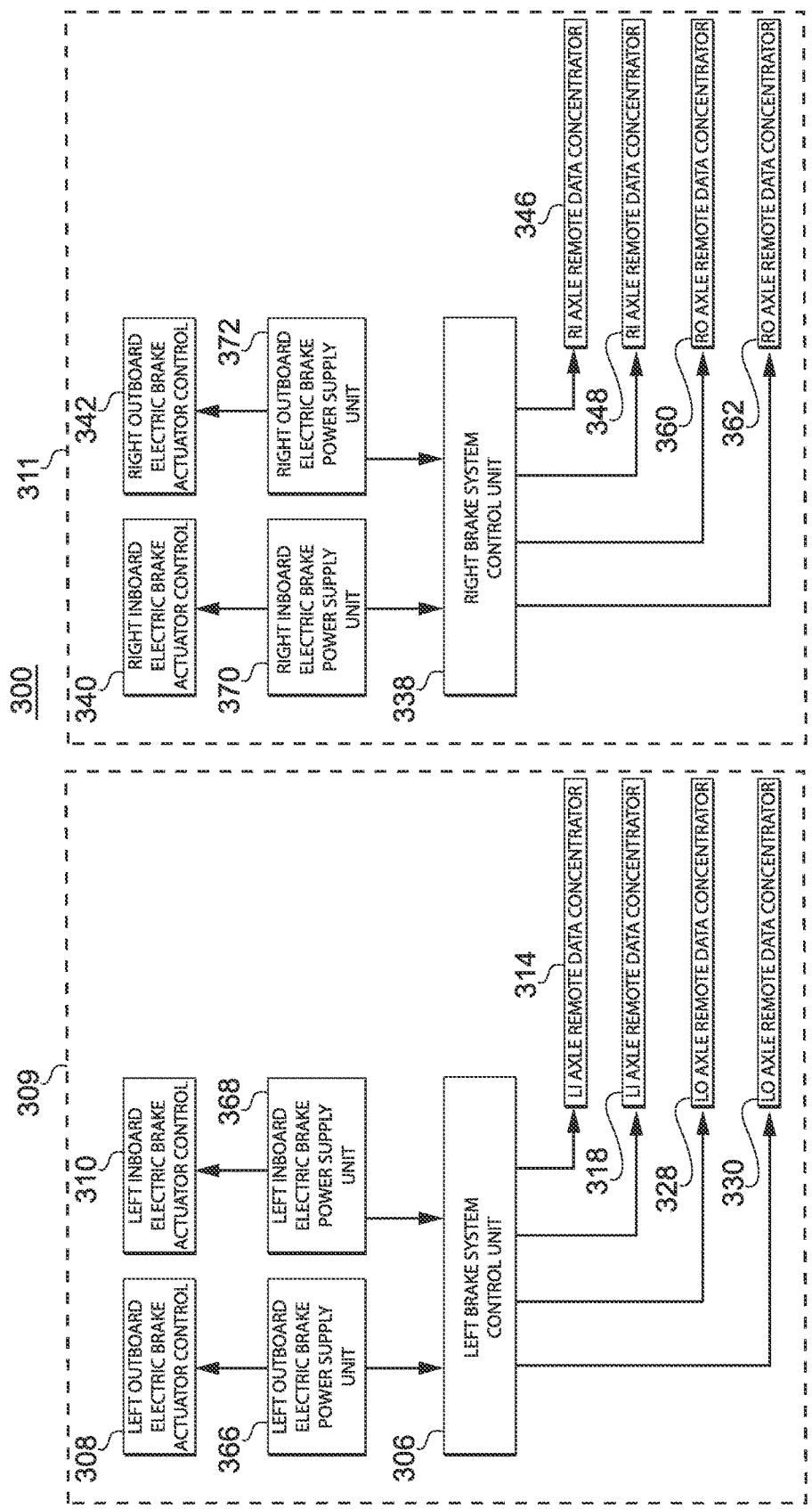
FIG. 4 is a schematic representation of an electrical power distribution system of the electrical braking system depicted in FIG. 3.

FIG. 4 is a schematic representation of an electrical power distribution arrangement suitable for use with electrical braking system 300. As shown in FIG. 4, the example electrical power distribution arrangement includes a left side electric power distribution subsystem 309 configured to supply power to the left side electrical braking subsystem architecture 301 and a right side electric power distribution subsystem 311 configured to supply power to the right side electrical braking subsystem architecture 303. In this regard, separate EBPSU improves system availability from possible failures and threats that can result in loss of power.

The electrical power distribution arrangement may include four electric brake power supply units ("EBPSUs"): a left outboard EBPSU 366; a left inboard EBPSU 368; a right outboard EBPSU 372; and a right inboard EBPSU 370. The left outboard EBPSU 366 and the left inboard EBPSU 368 are each configured to supply power to the left BSCU 306. The left RDCs (reference numbers 314, 318, 328 and 330) are configured to receive power from the left BSCU 306 via the left EBPSUs 366/368. Similarly, the right outboard EBPSU 372 and the right inboard EBPSU 370 are each configured to supply power to the right BSCU 338. The right RDCs (reference numbers 346, 348, 360, and 362) are configured to receive power from the right BSCU 338 via the right EBPSUs 370/372. Additionally, the BSCUs may be configured to control the EBPSUs.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. An electric brake system for an aircraft having at least one left landing gear wheel and at least one right landing gear wheel, the system comprising:
   a right brake system control unit configured to generate brake control signals for the at least one right landing gear wheel in response to pilot input, wherein said right brake system control unit independently operates only said right electric brake;
   a left brake system control unit configured to generate brake control signals for the at least one left landing gear wheel in response to pilot input, wherein said left brake system control unit independently operates only said left electric brake;
   at least one right electric brake actuator control, coupled to and controlled by the right brake system control unit, comprising a microcontroller including processing logic and software configured to generate electronic brake mechanism control signals, including anti-skid signals, only for the at least one right landing gear wheel; and
   at least one left electric brake actuator control coupled to and controlled by the left brake system control unit, comprising a microcontroller including processing logic and software configured to generate electronic brake mechanism control signals, including anti-skid signals, only for the at least one left landing gear wheel.

2. An electric brake system according to claim 1, wherein:
   the at least one left landing gear wheel includes N left wheel groups;
   the at least one left electric brake actuator control includes N left electric brake actuator controls respectively coupled to the N left wheel groups;
   the at least one right landing gear wheel includes N right wheel, groups; and
   the at least one right electric brake actuator control includes N right electric brake actuator controls respectively coupled to the N right wheel groups.

3. An electric brake system according to claim 2, further comprising:
   a plurality of right sensors each coupled to a wheel in the N right wheel groups and configured to measure data corresponding to the wheel in the N right wheel groups; and
   a plurality of left sensors each coupled to a wheel in the N left wheel groups and configured to measure data corresponding to the wheel in the N left wheel groups.

4. An electric brake system according to claim 2, wherein each wheel group has a fore wheel and an aft wheel.

5. An electric brake system according to claim 1, further comprising:
   the at least one left landing gear wheel includes a left inboard and a left outboard wheel groups;
   the at least one left electric brake actuator control includes a left outboard and a left inboard electric brake actuator controls respectively coupled to the left outboard and the left inboard wheel groups;
   the at least one right landing gear wheel includes a right inboard and a right outboard wheel groups; and
   the at least one right electric brake actuator control includes a right outboard and a right inboard electric brake actuator controls respectively coupled to the right outboard and the right inboard wheel groups.

6. An electric brake system according to claim 1, further comprising:
   a left pilot pedal configured to construct the pilot input to generate the brake control signals for the at least one left landing gear wheel; and
   a right pilot pedal to construct the pilot input to generate the brake control signals for the at least one right landing gear wheel group.

7. An electric brake system according to claim 1, further comprising:
   at least one left electric brake power supply unit configured to supply power to the left brake system control unit and to the at least one left electric brake actuator control; and at least one right electric brake power supply unit configured to supply power to the right brake system control unit and to the at least one right electric brake actuator control.

8. An electric brake system according to claim 1, further comprising a plurality of remote data concentrators ("RDCs"), a respective RDC being coupled to each of the at least one left landing gear wheel and the at least one right landing gear wheel, and each RDC being configured to collect and transmit wheel data for its respective landing gear wheel.

9. An electric brake system according to claim 8, wherein:
the plurality of remote data concentrators ("RDCs") include at least one left RDC corresponding to the at least one left landing gear wheel, and at least one right RDC corresponding to the at least one right landing gear wheel;
the electric brake system further comprises a first digital data communication bus configured to communicate wheel data from the at least one left RDC to the left brake system control unit; and
the electric brake system further comprises a second digital data communication bus configured to communicate wheel data from the at least one right RDC to the right brake system control unit.

10. An electric brake system according to claim 8, wherein:
the at least one right remote data concentrators ("RDCs") is, further, configured to receive power from the right brake system control unit; and the at least one left RDC is, further, configured to receive power from the left brake system control unit.

11. An electric brake system according to claim 1, further comprising:
at least one right electric brake power supply unit, configured to supply power to the right brake system control unit and to the at least one right electric brake actuator control unit; and
at least one left electric brake power supply unit, configured to supply power to the left brake system control unit and to at least one left electric brake actuator control unit.

12. An electric brake system for an aircraft having at least one left landing gear wheel and at least one right landing gear wheel, the system comprising:
at least one left remote data concentrator ("ROC") for the at least one left landing gear wheel, the at least one left RDC being configured to collect wheel data for the at least one left landing gear wheel;
at least one right RDC for the at least one right landing gear wheel, the at least one right RDC being configured to collect wheel data for the at least one right landing gear wheel;
at least one left electric brake actuator control comprising a microcontroller including processing logic and software configured to generate electronic brake control signals for only the at least one left landing gear wheel in response to wheel data collected by the at least one left RDC; and
at least one right electric brake actuator control comprising a microcontroller including processing logic and software configured to generate electronic brake control signals, including anti-skid signals, for only the at least one right landing gear wheel in response to wheel data collected by the at least one right RDC, each of said left and right brake actuator controls being independently operable.

13. An electric brake system according to claim 12, wherein:
the at least one right landing gear wheel includes a first right inboard wheel, a second right inboard wheel, a first right outboard wheel, and a second right outboard wheel; and
the at least one left landing gear wheel includes a first left inboard wheel, a second left inboard wheel, a first left outboard wheel, and a second left outboard wheel.

14. An electric brake system according to claim 13, wherein:
the at least one right remote data concentrators ("RDCs") includes a first right inboard RDC coupled to the first right inboard wheel, a second right inboard RDC coupled to the second right inboard wheel, a first right outboard RAC coupled to the first right outboard wheel, and a second right outboard RDC coupled to the second right outboard wheel; and
the at least one left RDC includes a first left inboard RDC coupled to the first left inboard wheel, a second left inboard RDC coupled to the second left inboard wheel, a first left outboard RDC coupled to the first left outboard wheel, and a second left outboard RDC coupled to the second left outboard wheel.

15. An electric brake system according to claim 14, further comprising:
a right outboard electric brake actuator control coupled to the first and the second right outboard remote data concentrators ("RDCs") and being configured to generate brake control signals for the first and the second right outboard landing gear wheels in response to wheel data collected by the right outboard RDCs; and
a right inboard electric brake actuator control coupled to the first and the second right inboard RDCs and being configured to generate brake control signals for the first and the second right inboard landing gear wheels in response to wheel data collected by the right inboard RDCs, said right inboard electric brake actuator control independently operable with respect to said right outboard electric brake actuator control;
a left outboard electric brake actuator control coupled to the first and the second left outboard RDCs and being configured to generate brake control signals for the first and the second left outboard landing gear wheels in response to wheel data collected by the left outboard RDCs; and
a left inboard electric brake actuator control coupled to the first and the second left inboard RDCs and being configured to generate brake control signals for the first and the second left inboard landing gear wheels in response to wheel data collected by the left inboard RDCs, said left inboard electric brake actuator control independently operable with respect to said left outboard electric brake actuator control.

16. An electric brake system according to claim 12, further comprising:
at least one right electric brake power supply unit, configured to supply power to a right brake system control unit and to the at least one right electric brake actuator control unit; and
at least one left electric brake power supply unit, configured to supply power to a left brake system control unit and to the at least one left electric brake actuator control unit.

17. An electric brake system according to claim 16, wherein:

the at least one left remote data concentrators ("RDCs") is, further, configured to receive power from the left brake system control unit; and the at least one right RDC is, further, configured to receive power from the right brake system control unit.

18. An electric brake system for an aircraft having at least one landing gear wheel, the system comprising:

left and right brake system control units configured to generate brake control signals for at least one respective left and right landing gear wheels only in response to pilot input, said left and right brake system control units independently operates only a respective left or right brake system; and at least one electric brake actuator control coupled to and controlled by a respective brake system control unit, the at least one electric brake actuator control unit comprising a microcontroller including processing logic and software configured to generate electronic brake mechanism control signals, including anti-skid signals, for only a corresponding one of the at least one respective left and right landing gear wheels.

19. An electric brake system according to claim 18, further comprising:

the at least one landing gear wheel includes inboard and outboard wheel groups; and the at least one electric brake actuator control includes outboard and inboard electric brake actuator controls respectively coupled to the outboard and the inboard wheel groups.

20. An electric brake system according to claim 18, wherein the brake system control unit is, further, configured to generate the brake control signals using a digital data transmission protocol.

21. An electric brake system according to claim 18, wherein the at least one electric brake actuator control unit is, further, configured to generate the brake mechanism control signals using a digital data transmission protocol.

* * * * *